United States Patent Office 3,037,815
Patented June 5, 1962

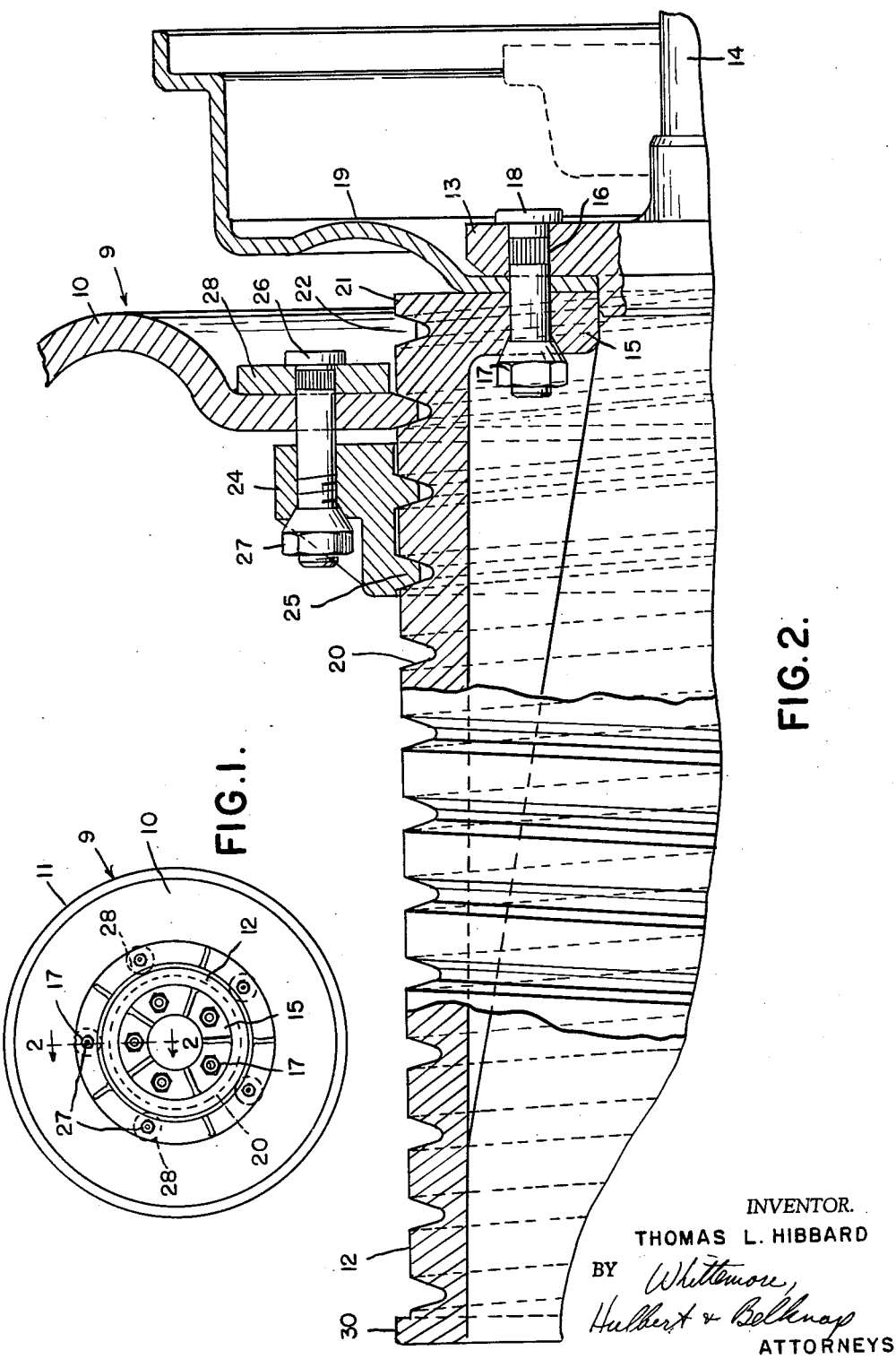

3,037,815
VARIABLE TREAD WHEEL
Thomas L. Hibbard, Birmingham, Mich., assignor to Kelsey-Hayes Company, Detroit, Mich., a corporation of Delaware
Filed June 15, 1959, Ser. No. 820,352
2 Claims. (Cl. 301—1)

This invention relates to wheels and refers more particularly to an adjustable tread wheel for a vehicle such as a tractor, in which it is desirable to adjust the axial spacing of the wheels.

The invention has for one of its objects to provide an adjustable tread wheel which is strong and rugged, and which is automatically adjustable.

The invention has for another object to provide an adjustable tread wheel which is of a simple and inexpensive construction.

The invention has for still another object to provide an adjustable tread wheel which is capable of adjustment over a wide range.

Other objects and features of the invention will become apparent as the description proceeds, especially when taken in conjunction with the accompanying drawing, illustrating a preferred embodiment of the invention, wherein:

FIG. 1 is a side elevational view, from the outboard side, of an adjustable tread wheel embodying the invention.

FIG. 2 is an enlarged fragmentary sectional view taken on the line 2—2 of FIG. 1.

The wheel 9 of the invention comprises a wheel body or disc 10 of heavy duty construction such as is required for a tractor, and a tire rim 11 secured to and encircling the disc. A mounting drum 12 is provided for axially adjustably mounting the wheel on the annular flange 13 of axle 14. The drum 12 is in the form of a hollow cylinder and is mounted concentrically with respect to axle 14. As shown, the drum or cylinder has at its inner end an integral radially inwardly extending annular flange 15 clamped to the axle flange 13 by bolts 16 and nuts 17 threaded thereon. The bolt shanks extend through matching apertures in flanges 13 and 15 and are secured in the apertures of flange 13 by staking. Access may be had to the hollow interior of the drum for manipulating nuts 17 through the open axially outer end of the drum. The integral head 18 of each bolt cooperates with the associated nut 17 in removably securing the drum to the axle flange. It will be noted that the web of a brake drum 19 is clamped between flanges 13 and 15.

The drum 12 has a single continuous helical groove 20 in its radially outer surface extending axially from end to end thereof. The wheel disc 10 has a center hole 21 and the disc is radially split from hole 21 and warped so that its inner margin defining the hole extends helically. Along the inner margin of the disc a rib 22 is provided which extends helically and has the same lead as the groove 20. Helical rib 22 extends for approximately 360° and engages in groove 20.

A clamping ring 24 encircles the drum and has a helical rib 25 around its inner surface which has the same lead as and engages in groove 20. Rib 25 extends for approximately 360°. The clamping ring 24 and disc 10 are connected together by a plurality of bolts 26 and nuts 27 threaded thereon. The bolt shanks extend freely through matching apertures in the clamping ring and wheel disc. Reinforcing plates 28 are also provided secured to the axially inner side of the wheel disc and apertured to receive the bolt shanks which are secured therein by staking.

To effect an adjustment of the wheel, the nuts 27 are loosened so that the helical ribs 22 and 25 of the wheel disc 10 and clamping ring 24 respectively are free to turn in the groove 20 of mounting drum 12. Power may then be applied to the axle to spin the drum and effect an axial adjustment of the wheel disc and clamping ring. An annular rib 30 projects radially outwardly at the axially outer end of the mounting drum to provide a limit for wheel adjustment by engagement with the clamping ring. Thereafter the nuts 27 are tightened to draw the wheel disc and clamping ring toward each other producing a tight wedging or frictional grip between the helical ribs of the wheel disc and clamping ring and the drum groove, thereby to frictionally retain the wheel against rotation relative to the axle so that driving torque may be transmitted to the wheel.

The wheel 9 is mounted by threading the clamping ring and wheel disc onto the mounting drum from the axially inner end thereof, and then mounting the drum on the axle flange 13 by installing it on the shanks of the fixed bolts 16 and applying the nuts 17.

What I claim as my invention is:

1. In an adjustable tread wheel, a mounting drum in the form of an axially extending cylinder, a wheel having a wheel body and tire rim, said cylinder having in its radially outer surface a helical groove provided with an axial lead, said wheel body encircling said cylinder and having a helical rib engaging said groove for axial adjustment of said wheel body on said cylinder when the latter are relatively rotated, and means for frictionally clamping said wheel body and cylinder together against relative rotation to thereby retain said wheel body in predetermined axially adjusted position relative to said cylinder comprising a clamping ring encircling said cylinder in axially spaced relation to said wheel body and having a helical rib engaging said groove for axial adjustment of said clamping ring on said cylinder when said clamping ring and cylinder are relatively rotated, and means for holding said clamping ring and wheel body against relative rotation and for drawing said clamping ring and wheel body axially toward one another to increase frictional contact between the sides of said groove and the sides of the ribs of said wheel body and clamping ring to thereby frictionally retain said wheel body in predetermined axially adjusted position relative to said cylinder, said last-mentioned means comprising threaded nut and bolt assemblies connecting said wheel body and clamping ring.

2. The structure defined in claim 1 wherein said clamping ring is on the axially outer side of said wheel body and said cylinder has on its radially outer surface an annular rib projecting radially outwardly therefrom at the axially outer end of said cylinder in position to be engaged by said clamping ring to provide a limit of axially outward adjustment of said wheel body and clamping ring.

References Cited in the file of this patent

UNITED STATES PATENTS

| | | |
|---|---|---|
| 1,072,425 | Candee | Sept. 9, 1913 |
| 2,324,681 | Dekker | July 20, 1943 |
| 2,540,459 | Ronayne | Feb. 6, 1951 |
| 2,755,138 | Brink | July 17, 1956 |

FOREIGN PATENTS

| | | |
|---|---|---|
| 811,786 | Germany | Aug. 23, 1951 |